(12) United States Patent
Grubb et al.

(10) Patent No.: US 6,962,204 B2
(45) Date of Patent: *Nov. 8, 2005

(54) ISOLATION CONTAINER FOR A DOWNHOLE ELECTRIC PUMP

(75) Inventors: William A. Grubb, Houston, TX (US); David M. Haugen, League City, TX (US); Corey E. Hoffman, Magnolia, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/414,994

(22) Filed: Apr. 16, 2003

(65) Prior Publication Data

US 2003/0192697 A1 Oct. 16, 2003

Related U.S. Application Data

(63) Continuation of application No. 09/608,077, filed on Jun. 30, 2000, now Pat. No. 6,568,475.

(51) Int. Cl.$^7$ .............................................. E21B 43/26
(52) U.S. Cl. .................................................. 166/305.1
(58) Field of Search ............................ 166/305.1, 306, 166/105, 107; 417/410.1, 559

(56) References Cited

U.S. PATENT DOCUMENTS

| | | | |
|---|---|---|---|
| 2,748,719 A | 6/1956 | Wells | 103/203 |
| 3,432,992 A | 3/1969 | Moore | 55/51 |
| 4,009,756 A | 3/1977 | Zehren | 166/250 |
| 4,187,912 A | 2/1980 | Cramer | 166/314 |
| 4,440,221 A | 4/1984 | Taylor | 166/106 |

(Continued)

FOREIGN PATENT DOCUMENTS

WO 97/08459 3/1997 ............ F04B/49/00

Primary Examiner—David Bagnell
Assistant Examiner—Daniel P Stephenson
(74) Attorney, Agent, or Firm—Moser, Patterson & Sheridan, L.L.P.

(57) ABSTRACT

An isolation container designed for use with a downhole electric pump assembly commonly used in oil and gas drilling and production operations is disclosed. The isolation container has an annular housing with an axial inlet and outlet bore. A downhole electric pump assembly is centrally located within the pressure isolation container. The downhole electric pump assembly includes an electric pump positioned above and coupled to a motor seal section which is positioned above and coupled to a centrifugal pump, thereby providing a means to power the centrifugal pump. A blind coupling is positioned above the electric motor with a tubular member connected thereto and extending through the inlet of the isolation container. The tubular member connects to a tubing string supplying fluid from the surface. The blind coupling has a plurality of radially disposed ports to allow pressurized fluid from the surface to flow into the annulus between the downhole electric pump and the isolation container. This fluid then flows to inlet ports on the downhole electric pump. The pressure of the pressurized fluid is then boosted or increased by the operation of the downhole electric pump. The fluid is then discharged through a tubular member, which is sealed in the outlet bore of the pressure isolation container. The tubular member extends through a packer positioned below the pressure isolation container and the boosted pressure fluid is injected into the subsurface formation. An electrical cable from the surface supplies power to the electric motor and a check valve is provided on the upper end of the pressure isolation container for releasing entrained air in the pressure isolation container.

16 Claims, 3 Drawing Sheets

U.S. PATENT DOCUMENTS

| | | | |
|---|---|---|---|
| 4,537,257 A | 8/1985 | Todd | 166/369 |
| 4,662,831 A | 5/1987 | Bennett | 417/430 |
| 4,696,343 A | 9/1987 | Anderson et al. | 166/164 |
| 5,133,407 A | 7/1992 | Deines et al. | 166/267 |
| 5,176,164 A | 1/1993 | Boyle | 137/155 |
| 5,188,172 A * | 2/1993 | Blount et al. | 166/64 |
| 5,203,682 A | 4/1993 | Inklebarger | 417/435 |
| 5,220,962 A | 6/1993 | Muller et al. | 166/369 |
| 5,269,180 A | 12/1993 | Dave et al. | 73/152 |
| 5,271,725 A | 12/1993 | Freet et al. | 417/423.3 |
| 5,517,854 A | 5/1996 | Plumb et al. | 73/151 |
| 5,626,467 A | 5/1997 | Cantley | 417/312 |
| 5,734,209 A | 3/1998 | Hallidy | 310/12 |
| 5,799,834 A | 9/1998 | Small et al. | 222/148 |
| 5,813,469 A | 9/1998 | Bowlin | 166/369 |
| 5,957,656 A | 9/1999 | De Long | 415/104 |
| 6,079,491 A | 6/2000 | Stuebinger et al. | 166/266 |
| 6,568,475 B1 * | 5/2003 | Grubb et al. | 166/305.1 |

* cited by examiner

ISOLATION CONTAINER FOR A DOWNHOLE ELECTRIC PUMP

CROSS-REFERENCE TO RELATED APPLICATIONS

This application is a continuation of co-pending U.S. patent application Ser. No. 09/608,077, filed Jun. 30, 2000 now U.S. Pat. No. 6,568,475, which is herein incorporated by reference.

BACKGROUND OF THE INVENTION

1. Field of the Invention

This invention relates to an isolation container for use with a downhole electric pump and the method of its application. The downhole electric pump is of the type used in the oil and gas industry. Such pumps usually are used for pumping oil and gas production to the surface when naturally occurring formation pressure is insufficient to raise the oil and gas to the surface. However, downhole electric pumps are also used in a downhole environment to increase the pressure of pressurized and un-pressurized fluids supplied from the surface. In these instances, the pressurized fluid is injected into the adjacent oil and gas bearing formation to treat or "fracture" the formation. In other applications, a downhole electric pump pressurizes fluid for injection into a formation to urge oil in the area of the wellbore in the direction of another nearby well where the oil is more easily produced. In these operations, any number of wells may be used to "chase" the underground oil to the collecting well. FIG. 1 is a sectional view of a prior art configuration utilizing a downhole electric pump assembly to inject high pressure fluid into a formation. The prior art configuration of FIG. 1 has a surface platform 10 (shown schematically) extending above ocean surface 12. Production riser 14 extends downwardly to hydraulically actuated connector 16 which is sealingly connected to wellhead housing 18 in a manner well known to those of ordinary skill in the art. Casing 20 extends from wellhead housing 18 to subsurface formation 22 and is cemented in place in ocean floor 24. Production tubing 26 extends from surface platform 10 through wellhead housing 18 to downhole packer 28 positioned in casing 20. Extension nipple 30 and coupling 32 connect production tubing 26 to downhole electric pump assembly 34. Lower extension nipple 36 extends from downhole electric pump assembly 34 through lower downhole packer 38 to that area of the wellbore adjacent subsurface formation 22. Downhole electric pump assembly 34 includes electric motor 40, motor seal section 41 and downhole electric pump 42. Electrical cable 44 extends from the surface to electric motor 40 in a manner well known to those of ordinary skill in the art.

A typical sequence of operation has fluid 46 supplied from surface platform 10 through production tubing 26 to downhole electric pump assembly 34 where it is taken into the pump assembly through intake ports 35. Thereafter, downhole electric pump assembly 34 increases the pressure of fluid 46 and then discharges it through lower extension nipple 36 into subsurface formation 22. In this manner, pressurized fluid 46 may be used to cause fracturing of the subsurface formation 22 to increase production capacity or it can be used to urge oil to another area of a field for collection at another well.

There are problems associated with prior art electric pumps used in a wellbore. As is visible in the apparatus of FIG. 1, the fluid for injection into the formation 22 must first be deposited in an annular area between the pump intake ports 35 and the well casing wall 20, subjecting the well casing 20 to any fluid used in the injection operation. Fluids used in these operations are often corrosive. For example, a fracturing operation can utilize additives like surfactants and acidizing fluids. In cases where water is injected into a formation, the water itself, especially sea water, can be corrosive. In those cases where the pressure of a fluid is increased at the well surface and then boosted by the downhole pump, the casing wall is subjected to the pressure of the fluid. Continued exposure of casing wall to the effects of corrosive and high pressure fluids can lead to a collapse of the casing well and ultimate exposure of the wellbore to the surrounding elements.

2. Description of the Related Art

U.S. Pat. No. 5,203,682 to B. A. Inklebarger shows a submersible pump assembly mounted in a container for use at the surface for pressurizing fluid.

The modular pump shown in U.S. Pat. No. 5,626,467 to G. A. Cantley discloses a fluid driven by an air motor.

U.S. Pat. No. 5,799,834 to D. D. Small et al. shows an adjustable length column pipe for connecting a submersible electric pump in a fuel storage tank to dispenser units.

SUMMARY OF THE INVENTION

The isolation container of the present invention is designed for use with a downhole electric pump or other electrical pump commonly used in oil and gas drilling and production operations. The Isolation container includes an annular vessel with an axial inlet and outlet bore. A downhole electric pump is centrally located within the isolation container. The downhole electric pump includes an electric motor positioned above and coupled to a motor seal section, which is then coupled to a centrifugal pump, thereby providing a means of powering the pump. A blind coupling is positioned above the electric motor with a tubular member connected thereto and extending through the inlet of the isolation container. The tubular member connects to a tubing string supplying fluid from the surface. The blind coupling has a plurality of radially disposed ports to allow fluid from the surface to flow into the annulus between the downhole electric pump and the isolation container. This fluid then flows to inlet ports on the downhole electric pump. The pressure of the fluid is increased or boosted by the operation of the downhole electric pump and the fluid is discharged through a tubular member, which is sealed in the outlet bore of the isolation container. The tubular member extends through a packer positioned below the isolation container and the pressurized fluid is injected into the desired subsurface formation or zone for fracturing or for displacing oil towards an adjacent formation. An electrical cable from the surface supplies power to the electric motor and a check valve may be provided on the upper end of the isolation container for releasing entrained air in the isolation container. The container effectively isolates the casing wall of the well from the harmful effects of the fluid pumped by the pump.

A second embodiment using the isolation container of the present invention is disclosed. This embodiment uses the isolation container with a downhole electric pump commonly used in oil and gas drilling and production operations to inject a treatment fluid into a subsurface formation. The isolation container has the same construction as in the first embodiment. The tubing string above the isolation container has a remotely operable valve, such as by wireline, disposed in its bore. The tubing string extends above the isolation container, typically 200 to 500 feet in length, and is filled with the fluid to be used in the operation. The top of the tubing string is capped and electrical cable or "E" line as it referred to in the industry is attached to the cap. The "E" line is of the type commonly deployed from a wireline truck and typically is ¾ ¾" in diameter. The wireline truck is used to lower the tubing string and isolation container into position. As in the first embodiment, a coupling is positioned above the electric motor with a tubular member connected thereto and extending through the inlet of the isolation container. The coupling has a plurality of radially disposed ports to allow the fluid from the tubing string to flow into the annulus between the downhole electric pump and the isolation container when the tubing string valve is opened. The fluid then flows to inlet ports on the downhole electric pump. The pressure of the fluid is then increased or boosted by the operation of the downhole electric pump. The fluid is then discharged through a tubular member, which is sealed in the outlet bore of the isolation container. The tubular member extends through a packer positioned below the isolation container and the boosted pressure fluid is injected into the desired subsurface formation or zone for acidizing. The aforementioned "E" line is extended along the outside of the tubing string and supplies power to the electric motor.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings (FIGS. 2 and 3).

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
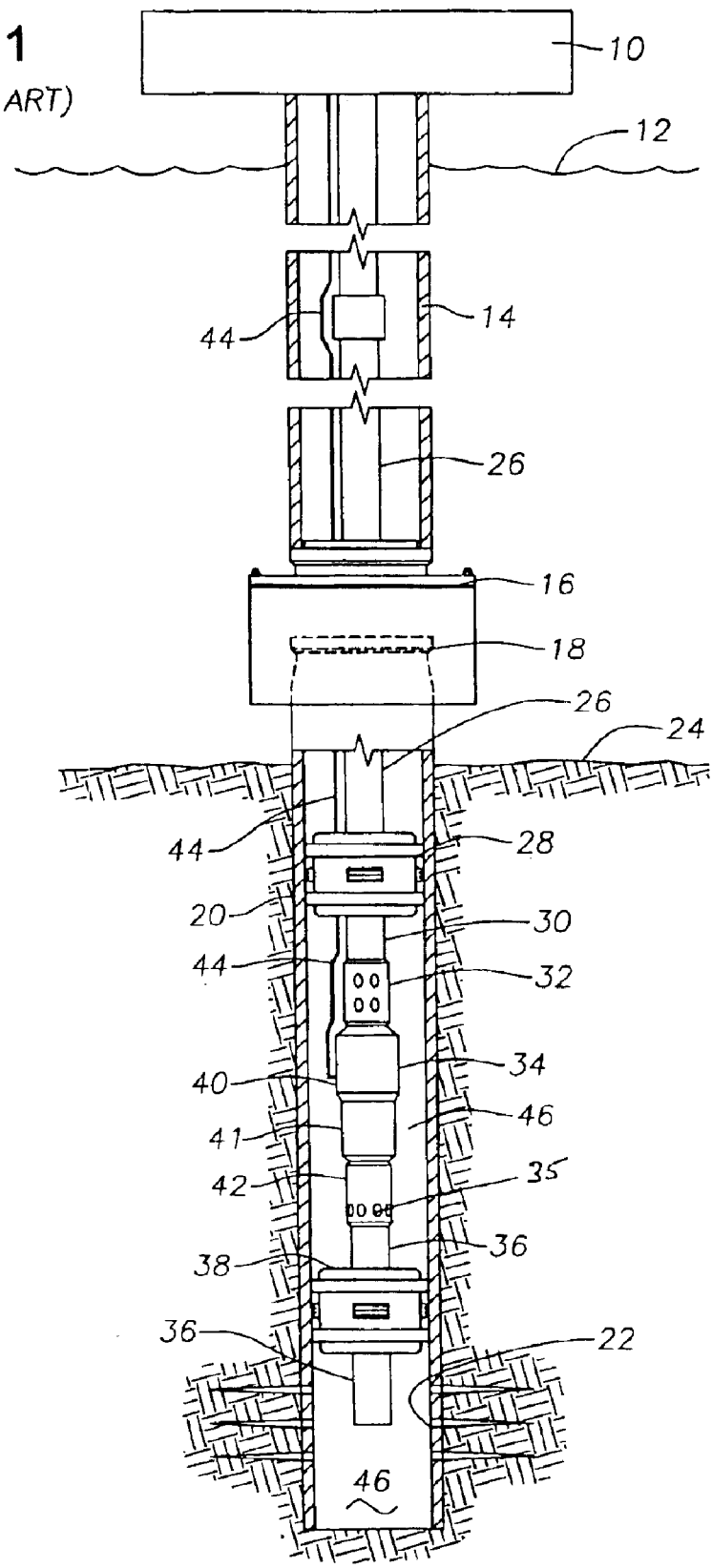
FIG. 1 is a section view of a prior art configuration with downhole packers positioned above and below a downhole electric pump that is used in formation fracturing and injection operations.
Figure 2:
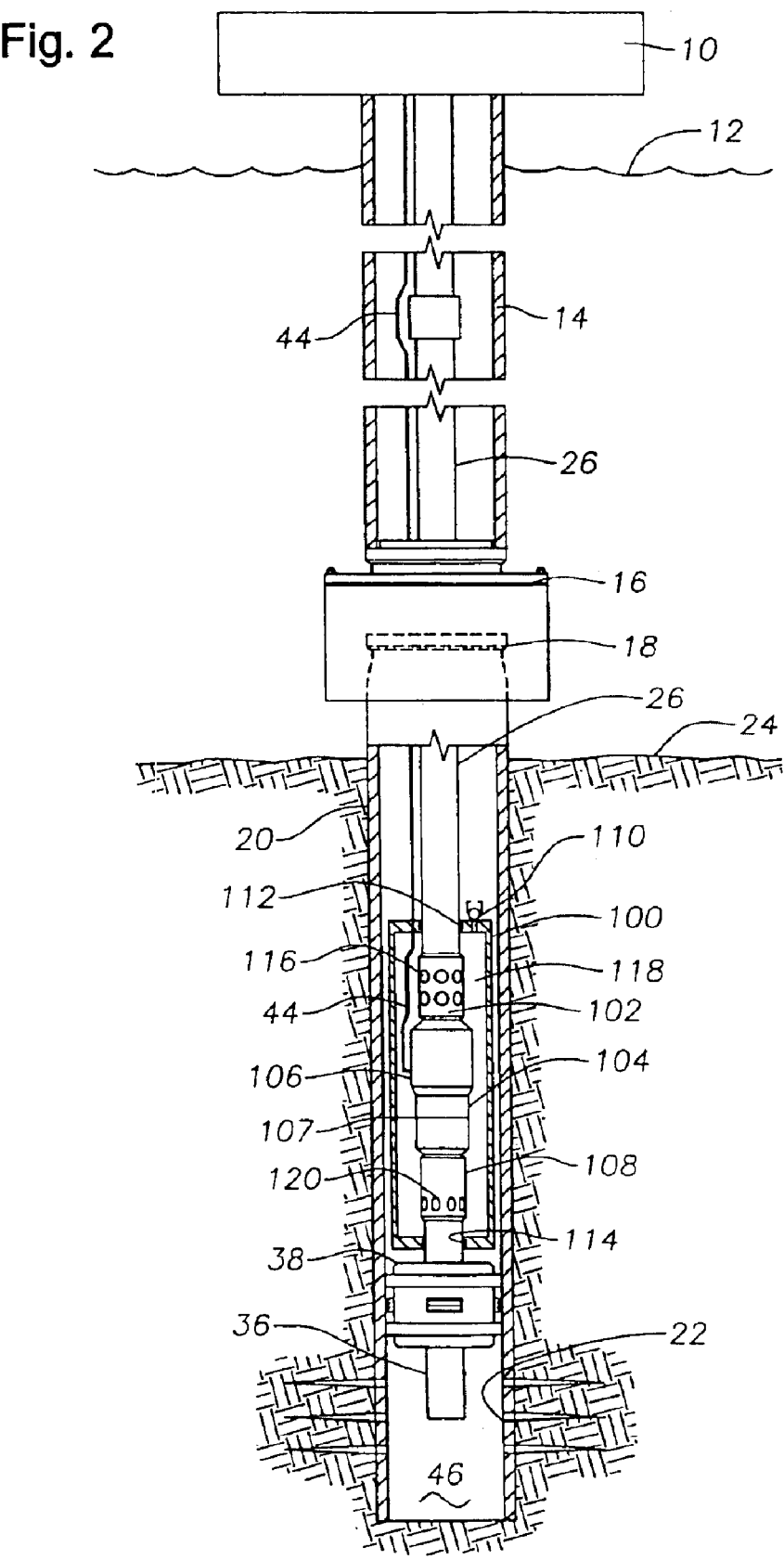
FIG. 2 is a section view of the isolation container of the present invention positioned in a well bore with a single downhole packer below allowing isolation of the high pressure fluid to be injected into the subsurface formation.

Referring to FIG. 2, a sectional view of an isolation container of the present invention utilizing a downhole electric pump assembly to inject high pressure fluid into a formation is shown. Those items which are the same as in the prior art configuration of FIG. 1, retain the same numerical designations. The configuration of the present invention has a surface platform 10 (shown schematically) extending above ocean surface 12. Production riser 14 extends downwardly to hydraulically actuated connector 16 which is sealingly connected to wellhead housing 18 in a manner well known to those of ordinary skill in the art. Casing 20 extends from wellhead housing 18 to subsurface formation 22 and is cemented in place in ocean floor 24. Production tubing 26 extends from surface platform 10 through wellhead housing 18 to isolation container 100 positioned in casing 20. Coupling 102 is threaded and sealed to production tubing 26. Coupling 102 connects downhole electric pump assembly 104 within isolation container 100. Lower extension nipple 36 extends from downhole electric pump assembly 104 through isolation container 100 and lower downhole packer 38 to subsurface formation 22.

Downhole electric pump assembly 104 includes electric motor 106, motor seal section 107 and downhole electric pump 108. Electrical cable 44 extends from the surface to downhole electric pump assembly 104 in a manner well known to those of ordinary skill in the art. Isolation container 100 is designed to isolate the wellbore casing 20 from fluid supplied from the surface including any pressure under which the fluid is delivered to the downhole region of the wellbore. Isolation container 100 may include check valve 110 for releasing any air trapped in pressurized fluid 46. Additionally, seal rings 112 and 114 provide sealing around tubing 26 and lower extension nipple 36. Isolation container will be typically be constructed of corrosion resistant material to withstand corrosive effects of pumped fluid and will also have sufficient wall thickness to resist any pressure of the fluid as it is delivered from the surface.

A typical sequence of operation has fluid 46 supplied from surface platform 10 through production tubing 26 and into isolation container 100. Coupling 102 has a plurality of radially disposed ports 116 therein. Ports 116 provide fluid communication for fluid 46, thereby allowing fluid to flow into annulus 118 between downhole electric pump assembly 104 and isolation container 100. Fluid 46 then flows into inlet ports 120 of downhole electric pump 108 where its pressure is increased or boosted. Pressurized fluid 46 is then discharged through lower extension nipple 36 through packer 38 and into subsurface formation 22. Pressurized fluid 46 may be used to cause fracturing of the subsurface formation 22 and thereby increase production capacity or it can be used to direct oil to another area for collection at another well. In this manner, the isolation container 100 allows fluid 46 to be boosted in pressure downhole without exposing the adjacent casing 20 to pressurized fluid 46.

Figure 3:
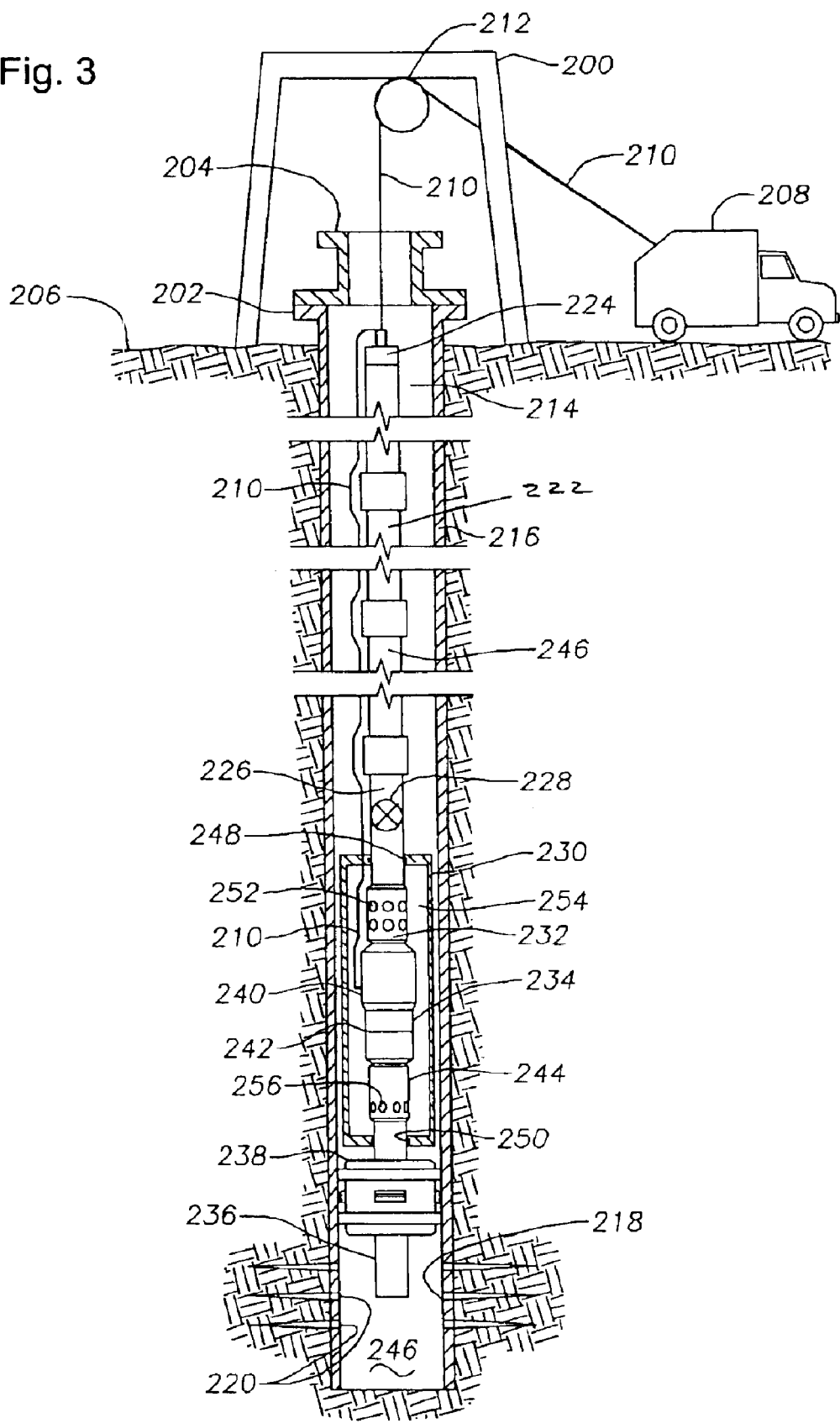
FIG. 3 is a section view of the isolation container of the present invention positioned in a well bore with a tubing string containing fluid above and a single downhole packer below allowing isolation of the casing from the fluid to be injected into the subsurface formation.

FIG. 3 is a sectional view of an isolation container of the present invention utilizing a downhole electric pump assembly for the purpose of injecting treatment fluid, such as acid into a formation. The arrangement is used to facilitate the treatment of a formation with fluid without the necessity of having a rig or even a source of coiled tubing at the well site. The configuration includes support frame 200 (shown schematically) extending above wellhead 202 and wireline blowout preventer 204 at ground level 206. Wireline truck 208 is positioned adjacent support frame 200 with structural and electrical line 210 running through pulley 212 and extending into wellbore 214. Casing 216 extends downwardly from wellhead 202 to subsurface formation 218 and is cemented in place with perforations 220 in casing 216 adjacent subsurface formation 218.

Tubing string 222 is capped at its upper end with wireline cap 224 and the wireline 210 is attached thereto in a manner whereby the weight of the tubing string 222 is supported by the wireline 210. From the cap 224, wireline extends along tubing string 222 to supply power to the downhole electric pump assembly. Tubing string 222 is composed of multiple tubing joints and is typically 200 to 500 feet in length. Tubing string 222 extends to valve adapter sub 226 which includes remotely operable valve 228. Valve adapter sub 226 extends into isolation container 230 positioned in casing 216. Coupling 232 is threaded and sealed to valve adapter sub 226, and connects to downhole electric pump assembly 234 within the isolation container 230.

Lower extension nipple 236 extends from downhole electric pump assembly 234 through isolation container 230 and lower downhole packer 238 to subsurface formation 218. Downhole electric pump assembly 234 includes electric motor 240, motor seal section 242 and downhole electric pump 244 as in the first embodiment. Electrical cable 210 extends from the surface to downhole electric pump assembly 234 in a manner well known to those of ordinary skill in the art. Isolation container 230 is designed to contain the pressure generated by the hydrostatic head of the fluid 246 contained within tubing string 222 and the pressure of fluid 246 and any corrosive effects associated therewith. Seal rings 248 and 250 provide sealing around valve adapter sub 226 and lower extension nipple 36.

In a typical sequence of operation, fluid 246 in enclosed and run into the wellbore in tubing string 222 where it is held therein by remotely operable valve 228. Tubing string 222 connects to valve adapter sub 226 and in turn to coupling 232 as previously described. Tubing string 222 and isolation container 230, including downhole electric pump assembly 234, are lowered into casing 216 on electrical cable 210 in a manner well known to those of ordinary skill in the art. At the appropriate depth, lower downhole packer 238 is actuated. Remotely operable valve 228 is then actuated to allow fluid 246 to flow downwardly to coupling 232 that has a plurality of radially disposed ports 252 therein. Ports 252 provide fluid communication for fluid 246 to flow into annulus 254 between the downhole electric pump assembly 234 and the isolation container 230. Fluid 246 then flows into the inlet ports 256 of the downhole electric pump 244 where its pressure is increased or boosted. Fluid 246 is then discharged (1) through lower extension nipple 236, (2) through packer 238, (3) through perforations 220, and (4) into subsurface formation 218. Thus, isolation container 230, in combination with tubing string 222, allows fluid 246 to be boosted in pressure and injected without exposing the casing 216 to fluid 246.

The construction of our isolation container for downhole electric pump assemblies will be readily understood from the foregoing description and it will be seen that we have provided a isolation containers for downhole electric pump assemblies for isolating a downhole electric pump assembly and the fluid it pumps from the surrounding wellbore casing, thereby ensuring that the surrounding casing is not exposed to high pressure and/or corrosive fluid. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

While foregoing is directed to the preferred embodiment of the present invention, other and further embodiments of the invention may be devised without departing from the basic scope thereof, and the scope thereof is determined by the claims that follow.

What is claimed is:

1. An isolation container apparatus for isolating a downhole pump assembly and a fluid pumped therethough from a wellbore therearound, the apparatus comprising:

an isolation container constructed and arranged to sealingly house the downhole pump assembly when the downhole pump assembly is oriented to pump fluids towards an earth formation;

a sealed inlet in an upper wall of the container permitting the passage of a fluid into an interior of the container, the sealed inlet being configured to receive a tubular string;

an upper coupling connecting the tubular string and an upper end of the pump assembly, the upper coupling having at least one outlet port therein;

a sealed outlet in a lower wall of the container permitting the passage of a pumped fluid from the interior of the container, the sealed inlet receiving a lower tubular member;

a lower coupling connecting a lower end of the pump assembly and the lower tubular member, the lower coupling having at least one inlet port therein through which fluids are delivered to the pump assembly; and a fluid path formed around the pump assembly permitting fluid to flow from the at least one outlet port into the at least one inlet port.

2. The apparatus of claim 1, wherein the pump assembly comprises a pump and a motor.

3. The apparatus of claim 2, further including a packing member to seal the wellbore around the tubular transporting the fluid from the sealed outlet.

4. The apparatus of claim 2, wherein the pump is an electric pump and includes a conductor supplying electrical power thereto from the well surface.

5. The isolation container apparatus of claim 1, further comprising:

a valve in the tubular string for selectively releasing a desired volume of fluid from the tubular string into the pump assembly after the isolation container apparatus has been run into the wellbore.

6. An apparatus for injecting formation treatment fluid into a formation while isolating the fluid from a cased wellbore therearound, the apparatus comprising:

a tubular string for containing a predetermined amount of fluid in a portion thereof;

a conveyance member attached to an upper end of the tubular string for lowering or raising the tubular string;

an isolation container at a lower end of the tubular string, the isolation container sealably receiving the tubular string in a first end and housing a pump assembly therein;

a valve assembly disposed in the string for selectively preventing the fluid in the tubular string from entering the isolation container, the valve assembly including a remotely operable valve, a valve adapter and an upper coupling with at least one port formed therein, wherein the valve is remotely operable to selectively allow fluid flow through the valve adapter and the at least one port in the coupling to the isolation container; and an exit tubular extending from an outlet port of the isolation container, the exit tubular for transporting pressurized fluid leaving the pump assembly.

7. The apparatus of claim 6, further including:

a packer disposed on the tubular string below the isolation container, the packer constructed and arranged to seal an annular area between the exit tubular and the wellbore therearound.

8. A method for injecting fluid into a formation while isolating the fluid from the wellbore, comprising:

locating and containing a predetermined amount of fluid in a tubular string, the fluid releasable from an upper portion of the string to a lower portion of the string at a predetermined time;

installing an isolation jacket with a pump assembly therein at a downhole end of the tubular string;

installing a packer on the tubular string below the jacket;

inserting the string into the wellbore, the string supported in the wellbore by a conveyance member;

setting the packer in the wellbore at a predetermined location;

releasing the fluid into the jacket by means of a remote valve; and pumping the fluid through a tubular extending from the jacket through the packer therebelow.

9. A method for injecting a fluid into a formation while isolating the fluid from a wellbore, comprising:

installing an isolation jacket having a tubular string and a connected pump assembly therein on a conveyance member;

containing a predetermined amount of fluid above the isolation jacket;

lowering the conveyance member into the wellbore thereby locating the isolation jacket, the pump assembly and the predetermined amount of fluid;

isolating a wellbore annulus formed between the wellbore and the isolation jacket from the wellbore below the isolation jacket;

opening a remotely operable valve on the tubular string, thereby releasing the fluid into the jacket; and actuating the pump assembly, thereby injecting the fluid into the formation.

10. The method of claim 9, wherein the conveyance member is a tubular string.

11. The method of claim 9, wherein the conveyance member is wire line.

12. The method of claim 9, wherein the conveyance member is coiled tubing.

13. The method of claim 9, wherein the conveyance member is slick line.

14. The method of claim 9, further comprising releasing accumulated gas from the isolation jacket through a valve member disposed proximate an upper end of the isolation jacket.

15. The method of claim 9, wherein the fluid is an acidizing fluid for treating the formation.

16. The method of claim 9, wherein the fluid is a formation fracturing solution for fracturing the formation.

* * * * *